(12) United States Patent
K S et al.

(10) Patent No.: US 9,967,178 B1
(45) Date of Patent: May 8, 2018

(54) FLOW RECORD SIZE REDUCTION

(71) Applicant: Juniper Networks, Inc., Sunnyvale, CA (US)

(72) Inventors: Nithyananda Vishnu K S, Bangalore (IN); Mithun Hebbar, Bangalore (IN); Abdul Kadhar Jeelany Habeeb Mohamed, Chennai (IN)

(73) Assignee: Juniper Networks, Inc., Sunnyvale, CA (US)

( * ) Notice: Subject to any disclaimer, the term of this patent is extended or adjusted under 35 U.S.C. 154(b) by 142 days.

(21) Appl. No.: 14/969,193

(22) Filed: Dec. 15, 2015

(51) Int. Cl.
*H04L 12/801* (2013.01)
*H04L 12/721* (2013.01)
*H04L 12/741* (2013.01)

(52) U.S. Cl.
CPC .......... *H04L 45/38* (2013.01); *H04L 45/745* (2013.01)

(58) Field of Classification Search
CPC ..... H04L 45/38; H04L 12/801; H04L 12/805; H04L 69/04
See application file for complete search history.

(56) References Cited

U.S. PATENT DOCUMENTS

| | | | | |
|---|---|---|---|---|
| 7,948,986 B1 * | 5/2011 | Ghosh | ..................... | H04L 45/50 370/392 |
| 8,005,012 B1 * | 8/2011 | Aybay | ..................... | H04L 43/02 370/232 |
| 8,072,894 B2 * | 12/2011 | Shi | ........................ | G06F 11/348 370/252 |
| 8,654,765 B2 * | 2/2014 | Singh | ...................... | H04L 43/04 370/235 |
| 8,867,566 B2 * | 10/2014 | Gill | ......................... | H04L 69/22 370/466 |
| 8,948,174 B2 * | 2/2015 | Szyszko | ........................ | 370/392 |
| 9,065,767 B2 * | 6/2015 | Dong | ..................... | H04L 47/38 |
| 9,246,828 B1 * | 1/2016 | Tagore | | |
| 9,407,450 B2 * | 8/2016 | Singh | ...................... | H04L 43/00 |
| 9,686,186 B2 * | 6/2017 | Liste | ...................... | H04L 45/38 |
| 9,807,006 B1 * | 10/2017 | Stark | ..................... | H04L 45/745 |
| 9,819,585 B1 * | 11/2017 | Stark | ..................... | H04L 45/745 |
| 2013/0003736 A1 * | 1/2013 | Szyszko | ............. | H04L 47/2441 370/392 |
| 2013/0117847 A1 * | 5/2013 | Friedman | .............. | H04L 63/102 726/22 |
| 2016/0315853 A1 * | 10/2016 | Liste | ....................... | H04L 45/38 |
| 2017/0078184 A1 * | 3/2017 | Tang | ...................... | H04L 45/02 |

OTHER PUBLICATIONS

Claise, "RFC 3954: Cisco Systems NetFlow Services Export Version 9," https://www.ietf.org/rfc/rfc3954.txt, Oct. 2004, 31 pages.
Wikipedia, "NetFlow," https://en.wikipedia.org/wiki/NetFlow, Nov. 3, 2015, 10 pages.

* cited by examiner

*Primary Examiner* — Tri H Phan
(74) *Attorney, Agent, or Firm* — Harrity & Harrity, LLP

(57) ABSTRACT

A device may receive a packet associated with a flow and may assign a flow identifier to the flow. The device may generate a first flow record based on a first template. The first flow record may include the flow identifier and a first quantity of fields determined based on the first template. The device may export the first flow record. The device may generate a second flow record, including the flow identifier, based on a second template and after exporting the first flow record. The second flow record may include a second quantity of fields, determined based on the second template, that is less than the first quantity of fields. The device may export the second flow record.

20 Claims, 5 Drawing Sheets

FLOW RECORD SIZE REDUCTION

BACKGROUND

Flow information export enables network devices, such as routers and switches, to collect flow data associated with network traffic and export the flow data to flow collectors. The flow collectors may aggregate the flow data, may perform traffic analysis, and may output the flow data for display to a network administrator. The flow data may be used for usage monitoring, network optimization, security analysis, or the like.

SUMMARY

According to some possible implementations, a device may receive a packet associated with a flow and may assign a flow identifier to the flow. The device may generate a first flow record based on a first template. The first flow record may include the flow identifier and a first quantity of fields that may be determined based on the first template. The device may export the first flow record. The device may generate a second flow record, including the flow identifier, based on a second template and after exporting the first flow record. The second flow record may include a second quantity of fields, determined based on the second template, that is less than the first quantity of fields. The device may export the second flow record.

According to some possible implementations, a non-transitory computer-readable medium may store one or more instructions that, when executed by one or more processors of a device, cause the one or more processors to receive network traffic associated with a flow and assign a flow identifier to the flow. The one or more instructions may cause the one or more processors to generate a first flow record based on a first template. The first flow record may include the flow identifier and a first quantity of fields that may be determined based on the first template. The one or more instructions may cause the one or more processors to export the first flow record. The one or more instructions may cause the one or more processors to generate a second flow record, including the flow identifier, based on a second template and after exporting the first flow record. The second flow record may include a second quantity of fields, determined based on the second template, that is less than the first quantity of fields. The one or more instructions may cause the one or more processors to export the second flow record.

According to some possible implementations, a method may include receiving network traffic associated with a flow and assigning a flow identifier to the flow. The method may include generating a first flow record based on a first template. The first flow record may include the flow identifier and a first quantity of fields that may be determined based on the first template. The method may include exporting the first flow record. The method may include determining that the first flow record has been exported. The method may include generating a second flow record, including the flow identifier, based on a second template. The second template may be different from the first template. The second flow record may include a second quantity of fields, determined based on the second template, that may be less than the first quantity of fields. The method may include exporting the second flow record.

DETAILED DESCRIPTION

The following detailed description of example implementations refers to the accompanying drawings. The same reference numbers in different drawings may identify the same or similar elements.

An exporter device, such as a router or switch, may receive packets (e.g., Internet Protocol (IP) packets, or the like) that are forwarded throughout and/or between networks. The exporter device may group packets that share common attributes (e.g., a source IP address, a destination IP address, a source port, a destination port, a protocol, or the like) into a flow, and may store information associated with the flow in a flow table. As the exporter device receives additional packets associated with the flow, the exporter device may update the flow table (e.g., update a packet count associated with the flow, a byte count associated with the flow, a duration of the flow, a timer associated with the flow, or the like).

According to a flow information export protocol (e.g., NetFlow, Internet Protocol Flow Information Export (IPFIX), or the like), the exporter device may export multiple flow records associated with the flow to a collector server (e.g., a server). Each flow record may include multiple fields corresponding to information associated with the flow (e.g., a source IP address, a destination IP address, a quantity of packets associated with the flow, a quantity of bytes associated with the flow, etc.). Additionally, one or more fields in a flow record may include values that remain the same between exports (e.g., may be the same in a first flow record and a second flow record, etc.). However, the one or more fields (e.g., associated with values that may remain the same between exports) may be exported in each flow record associated with the flow.

The exporter device may be responsible for exporting a considerable quantity of flow records to the collector server. For example, the exporter device may send, to the collector server, export packets including one or more flow records associated with one or more flows. Further, the collector server may receive export packets from multiple exporter devices. Thus, the size of each flow record and/or export packet may contribute to network congestion. As a result, the collector server may drop export packets and/or may fail to receive export packets from one or more exporter devices. Implementations described herein may assist in reducing the size of flow records and may assist in reducing the quantity of export packets needed to export flow records, thereby conserving processor, memory, and/or network resources.

Figure 1A:
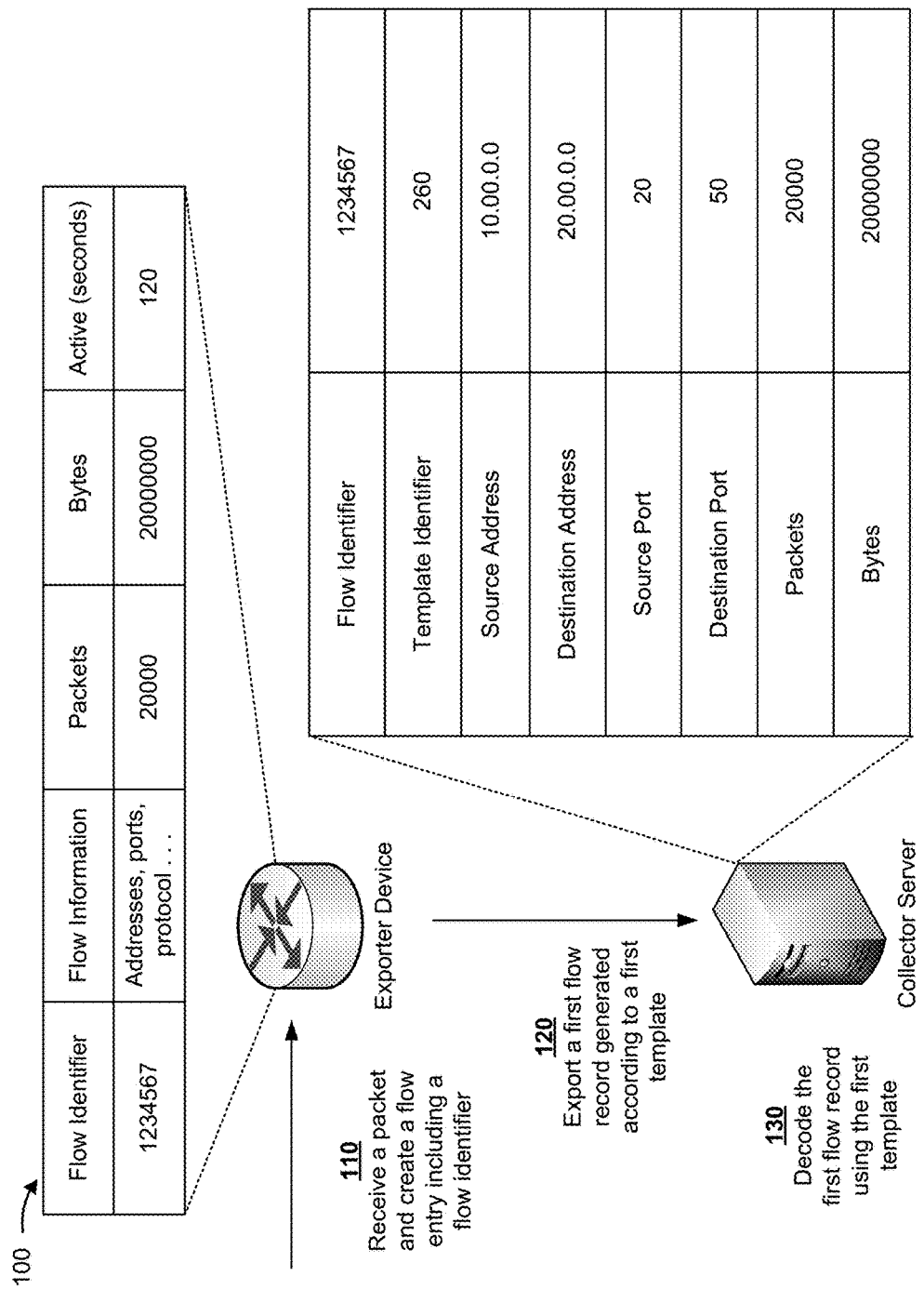
FIGS. 1A and 1B are diagrams of an overview of an example implementation described herein.
Figure 1B:
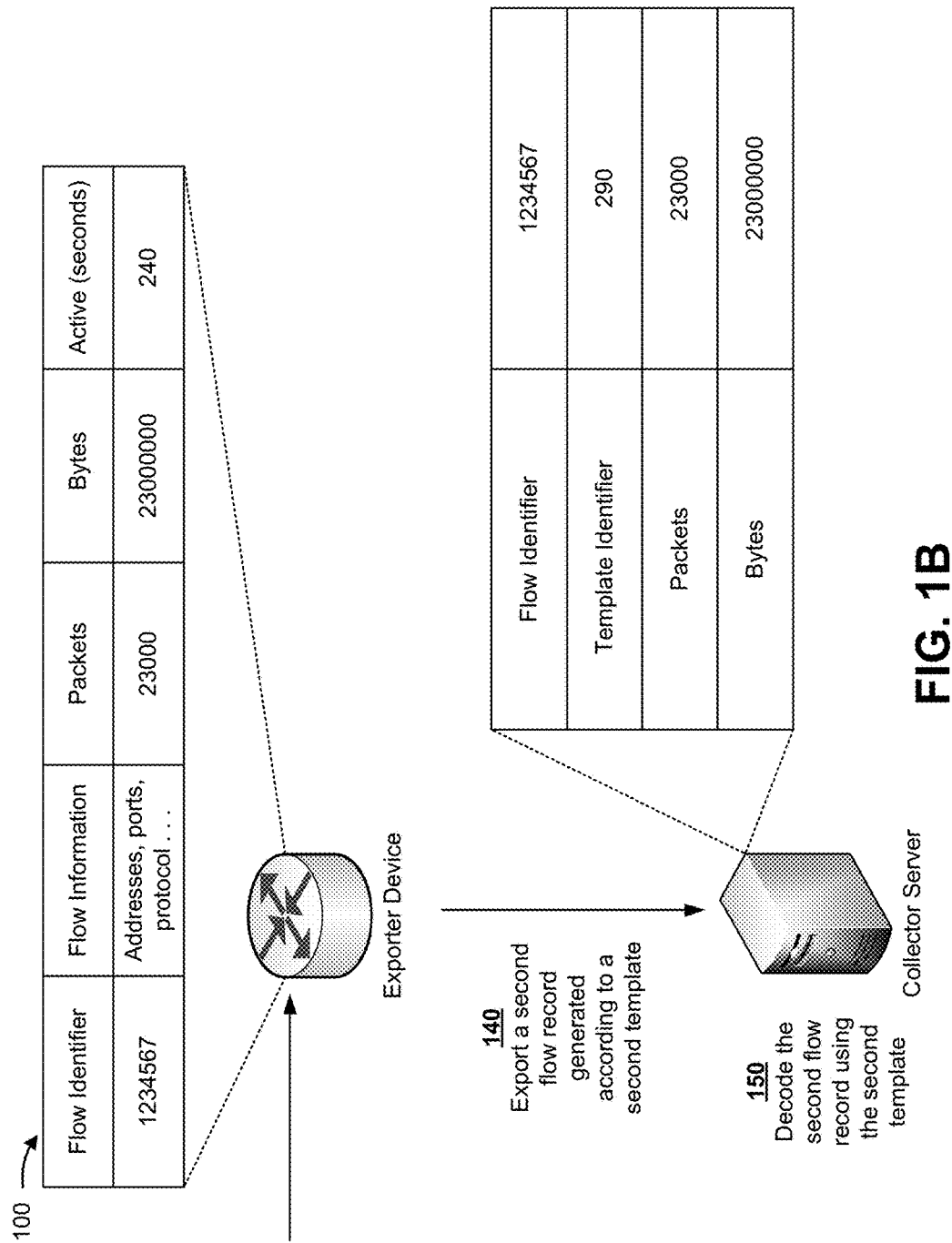

FIGS. 1A and 1B are diagrams of an overview of an example implementation 100 described herein. As shown in FIG. 1A, example implementation 100 may include an exporter device, such as a router. As shown by reference number 110, the exporter device may receive a packet and may create a flow entry including a flow identifier (e.g., in a flow table). In some implementations, the exporter device may create a flow identifier when the flow entry is created. For example, the received packet, and additional packets that are received, may be associated with a flow. A flow may include a sequence of packets that include one or more shared values. For example, each packet associated with a flow may include a common five-tuple in the packer header (e.g., a source address, a source port, a destination address, a destination port, and/or a protocol). A flow identifier may include a value that identifies a particular flow. For example, as shown, assume that the exporter device assigns a flow identifier including the value "1234567" to the flow. In some implementations, the flow identifier may be generated by hashing the five-tuple.

The exporter device may receive additional packets associated with the flow, and may store information associated with the flow in the flow table (e.g., a data structure, such as a cache). As the exporter device receives additional packets associated with the flow, the exporter device may update the information associated with the flow in the flow table (e.g., may update a byte count associated with the flow, may update a packet count associated with the flow, or the like).

As further shown in FIG. 1A, and as shown by reference number 120, the exporter device may export a first flow record to a collector server, such as a server. For example, the exporter device may export the first flow record associated with the flow based on an active timeout. Assume that the exporter device is configured to export a flow record based on an active timeout interval (e.g., every two minutes). For example, the exporter device may export the first flow record based on the flow being active for two minutes. The exporter device may generate the first flow record according to a first template. A template may include information specifying a format of a flow record, and may specify a quantity of fields to be included in the flow record.

Assume that the first template specifies a quantity of fields (e.g., fields indicating a flow identifier, a template identifier, a source address, a destination address, a source port, a destination port, a packet count associated with the flow, and/or a byte count associated with the flow). The exporter device may generate the first flow record to include information corresponding to each field (e.g., information from the flow table) and may export the first flow record to the collector server. The exporter device may reset one or more fields in the flow table based on exporting the first flow record (e.g., a packet count field, a byte count field, or the like).

As shown by reference number 130, the collector server may decode the first flow record using the first template. The collector server may identify a template identifier (e.g., "260") in the flow record, and may identify a template corresponding to the template identifier. For example, the collector server may receive the first template (e.g., corresponding to the flow identifier "260") from the exporter device, and may use the first template while decoding the first flow record.

The collector server may decode the first flow record and may store the decoded information in a data structure. For example, the collector server may store the information associated with the flow (e.g., the source address, the destination address, the source port, the destination port, etc.) with the flow identifier. In this way, the collector server may associate subsequent flow records, that include the flow identifier, with the flow information stored in the data structure.

As shown in FIG. 1B, assume that the exporter device exports a second flow record, associated with the same flow as described with regard to FIG. 1A, to the collector server. For example, the exporter device may export the second flow record based on the active timeout interval (e.g., the flow being active for another two minutes). As shown by reference number 140, the exporter device may export a second flow record generated according to a second template. For example, the second template may specify a quantity of fields that is less than the quantity of fields specified in the first template. For example, the second template may not include fields associated with values that remain the same between exports (e.g., fields indicating a source address, a destination address, a source port, a destination port, or the like).

Assume that the second template specifies a quantity of fields (e.g., fields indicating a flow identifier, a template identifier, a packet count associated with the flow, and a byte count associated with the flow). The exporter device may generate the second flow record to include information corresponding to each field (e.g., information from the flow table) and may export the second flow record to the collector server.

As shown by reference number 150, the collector server may decode the second flow record using the second template. For example, the collector server may identify a template identifier (e.g., "290") in the second flow record, and may identify the second template based on the template identifier. For example, the collector server may receive the second template (e.g., corresponding to the flow identifier "290") from the exporter device, and may use the second template while decoding the second flow record.

As shown, the collector server may decode the second flow record and may identify the flow identifier (e.g., "1234567"). Further, the collector server may identify information associated with the other fields included in the second flow record (e.g., a packet count field and a byte count field). The collector server may then identify the stored information associated with the flow identifier (e.g., the information included in the first flow record), and may update the flow information using the information from the second flow record (e.g., a packet count associated with the flow and a byte count associated with the flow).

In this way, the exporter device may export a first flow record that includes a flow identifier and a first quantity of fields (e.g., fields associated with values that change between exports and fields associated with values that remain the same between exports). The exporter device may then export subsequent flow records that include the flow identifier and a second quantity of fields that is less than the first quantity of fields (e.g., fields associated with values that change between exports). The collector server may store the information associated with the first flow record, and may update the information based on receiving subsequent flow records that include the flow identifier. In this way, the exporter device may reduce the size of flow records by not including fields that include values that are repetitive between exports (e.g., that are the same in a first export and a second export, etc.).

Implementations described herein may assist an exporter device in reducing the size of flow records, thereby conserving memory and processor resources. Additionally, implementations described herein may conserve network resources by reducing the size of flow records and/or by reducing the quantity of export packets needed during flow record export. Implementations described herein may also conserve memory and processor resources of the collector server based on the size reduction of the flow records. Implementations described herein may also reduce the quantity of dropped export packets by the collector server, thereby increasing accuracy of the stored flow information.

Figure 2:
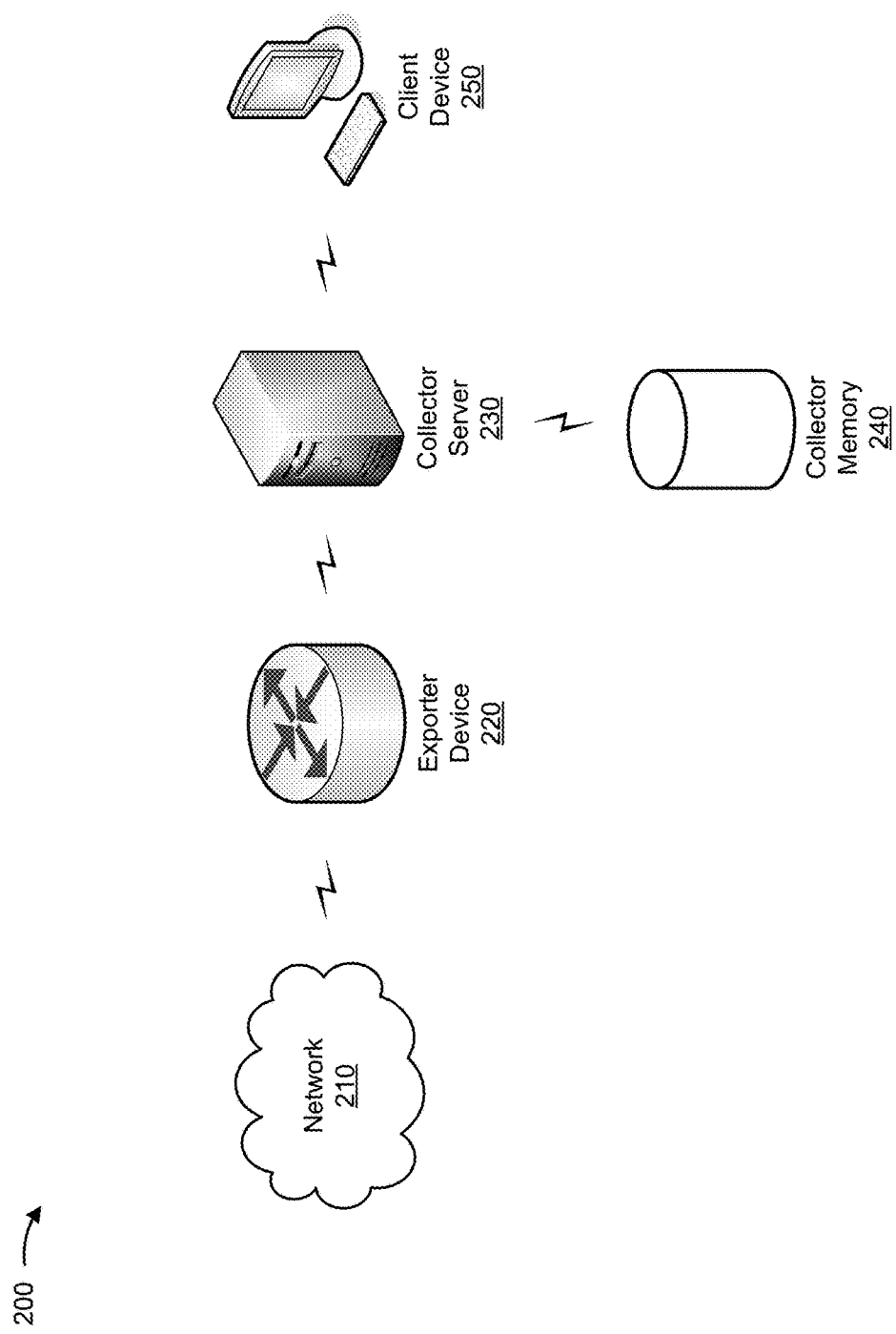
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a network 210, an exporter device 220, a collector server 230, a collector memory 240, and a client device 250. Devices of environment 200 may interconnect via wired connections, wireless connections, or a combination of wired and wireless connections.

Network 210 may include one or more wired and/or wireless networks. For example, network 210 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Exporter device 220 may include a device capable of storing, processing, and/or routing information. For example, exporter device 220 may include a traffic transfer device, such as a router, a switch, a gateway, a modem, a firewall, a network interface card (NIC), a hub, a bridge, a server device, or any other type of device that processes and/or transfers traffic. Exporter device 220 may receive network traffic associated with flows, may process flows, and/or may store flow information. Exporter device 220 may be configured with information identifying one or more templates and may generate flow records based on the one or more templates. In some implementations, exporter device 220 may generate, process, and/or transfer flow records, such as data records, template records, and/or other flow records. In some implementations, multiple exporter devices 220 may transmit flow records to one collector server 230. In some implementations, one exporter device 220 may transmit flow records to multiple collector servers 230.

Collector server 230 may include one or more devices capable of storing, processing, and/or routing information associated with flows. For example, collector server 230 may include a computing device, such as a server, a desktop computer, a laptop computer, a tablet computer, or the like. In some implementations, collector server 230 may be used to monitor and/or analyze flows. In some implementations, collector server 230 may generate, process, store, and/or provide decoding and/or interpretation of flow records received from exporter device 220 and/or another device. Additionally, or alternatively, collector server 230 may provide flow information to another device, such as client device 250. In some implementations, collector server 230 may include a communication interface that allows collector server 230 to receive information from exporter device 220, collector memory 240, client device 250, and/or another device. In some implementations, one collector server 230 may receive flow records from multiple exporter devices 220. In some implementations, multiple collector servers 230 may receive flow records from one exporter device 220.

Collector memory 240 may include one or more memory devices capable of processing, storing, and/or providing information. In some implementations, collector memory 240 may process, store, and/or provide information, such as information associated with one or more flows, template information for decoding and/or interpreting flow records, information associating template identifiers with corresponding template information, information associating flow identifiers with corresponding flow information, or the like.

Client device 250 may include a device capable of providing, presenting, and/or displaying information. For example, client device 250 may include a mobile phone (e.g., a smart phone, a radiotelephone, etc.), a computing device (e.g., a desktop computer, a laptop computer, a tablet computer, a handheld computer, etc.), or a similar device. In some implementations, client device 250 may include a communication interface that allows client device 250 to receive information from exporter device 220 and/or receive information from and/or transmit information to collector server 230. In some implementations, client device 250 may provide information, associated with one or more flows, for display to a network administrator for security monitoring, network analysis, or the like.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
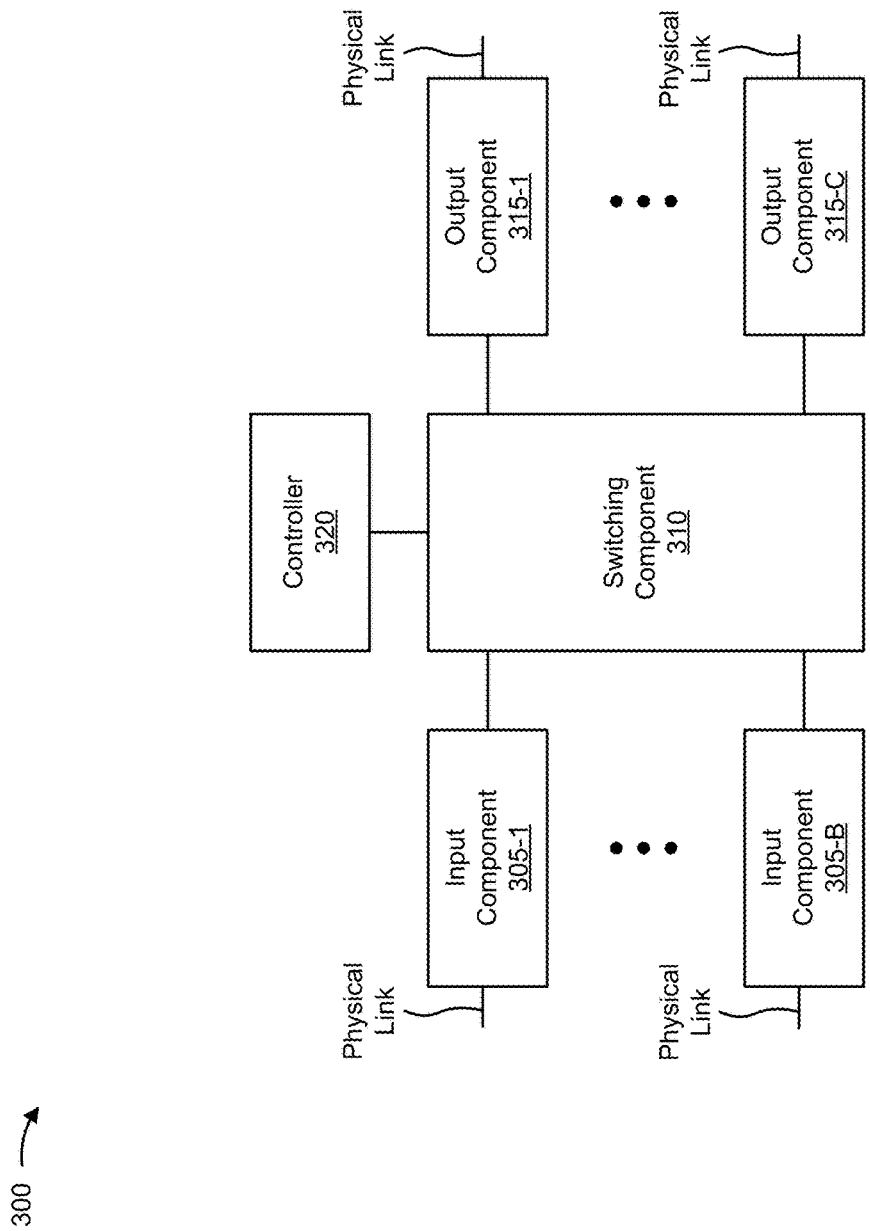
FIG. 3 is a diagram of example components of one or more devices of FIG. 2.

FIG. 3 is a diagram of example components of exporter device 220. As shown in FIG. 3, exporter device 220 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, exporter device 220 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, exporter device 220 may include one or more output components 315. In some implementations, input component 305 and output component 315 may be implemented by the same set of components (e.g., and input/output component may be a combination of input component 305 and output component 315).

Controller 320 is implemented in hardware, firmware, or a combination of hardware and software. Controller 320 includes a processor in the form of, for example, a central processing unit (CPU), a graphics processing unit (GPU), an accelerated processing unit (APU), a microprocessor, a field-programmable gate array (FPGA), an application-specific integrated circuit (ASIC), and/or another type of processor that can interpret and/or execute instructions. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to exporter device 220 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, exporter device 220 may include additional components, fewer components, different components, or differently arranged components than those shown in FIG. 3. Additionally, or alternatively, a set of components (e.g., one or more components) of exporter device 220 may perform one or more functions described as being performed by another set of components of exporter device 220.

Figure 4:
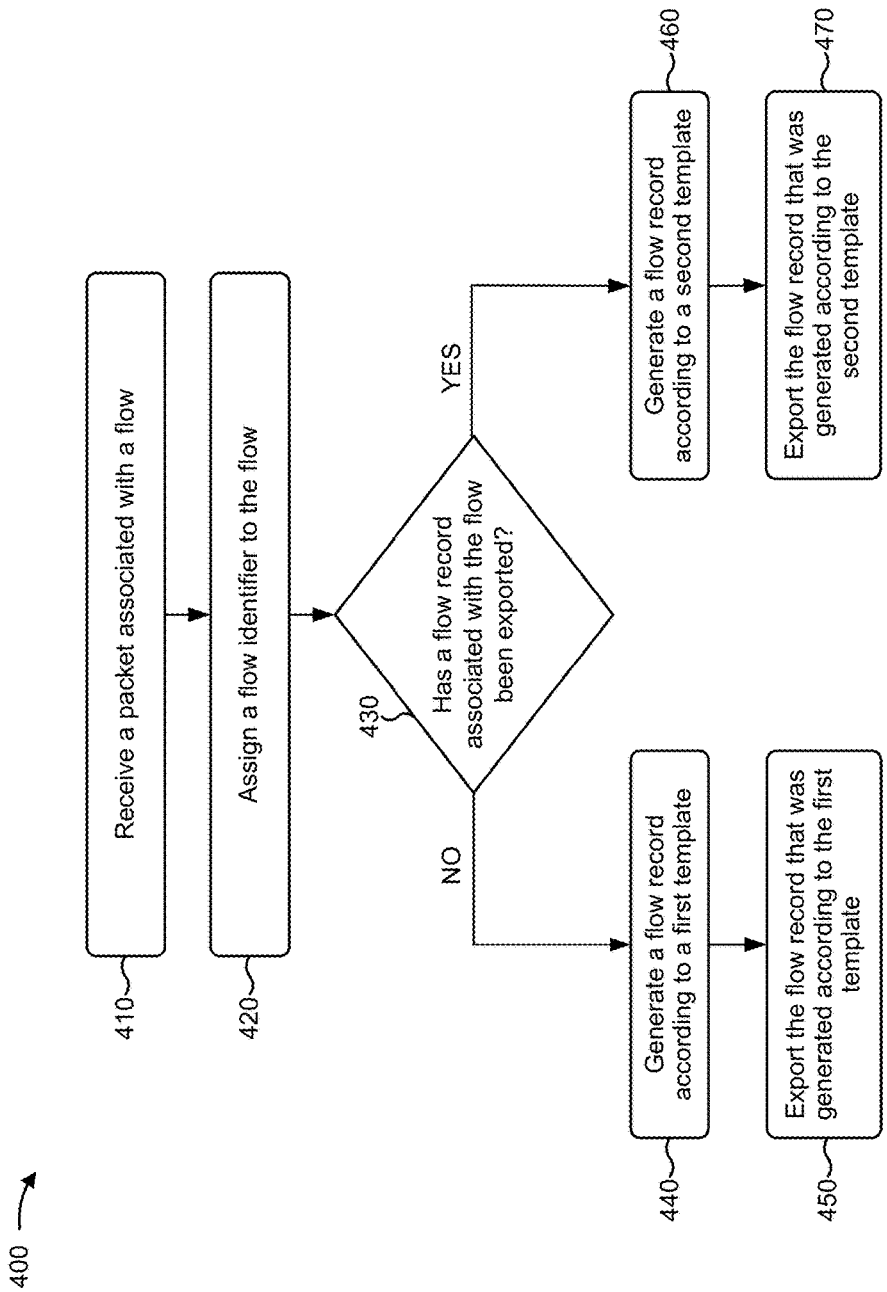
FIG. 4 is a flow chart of an example process for reducing the size of flow records.

FIG. 4 is a flow chart of an example process 400 for reducing a size of a flow record. In some implementations, one or more process blocks of FIG. 4 may be performed by exporter device 220. In some implementations, one or more process blocks of FIG. 4 may be performed by another device or a group of devices separate from or including exporter device 220, such as collector server 230, and/or client device 250.

As shown in FIG. 4, process 400 may include receiving a packet associated with a flow (block 410). For example, exporter device 220 may receive a packet associated with a flow. As used herein, a packet may refer to a communication structure for communicating information, such as a protocol data unit (PDU), a packet, a frame, a datagram, a segment, a message, a block, a cell, a frame, a subframe, a slot, a symbol, a portion of any of the above, and/or another type of formatted or unformatted unit of data capable of being transmitted via a network.

A flow may include a sequence of packets that include one or more shared values. For example, each packet associated with a flow may include a common tuple in the packet header (e.g., a source address, a source port, a destination address, a destination port, and/or a protocol). In some implementations, exporter device 220 may receive packets and may sample the received packets at a sampling rate (e.g., may sample each packet, may sample a subset (fewer than all) of the packets, or the like). For each sampled packet, exporter device 220 may derive information associated with the packet by identifying the information in a packet header and/or identifying the information in a routing table, for example. Exporter device 220 may store the information associated with the sampled packets (e.g., one or more values associated with the one or more sampled packets) in a flow table (e.g., a data structure, such as a cache, a hash table, or the like).

The flow table may store information associated with one or more flows, and may include a quantity of fields associated with each flow, such as a field indicating a source address, a destination address, a source port, a destination port, a protocol used for the packets in the flow, a packet count associated with the flow, a byte count associated with the flow, a maximum time to live value, a minimum time to live value, a type of service, a time of creation of the flow, autonomous system information, next hop information, a quantity of flow records that have been exported, a quantity of active timeouts, and/or the like.

The flow table may include a flow entry for each particular flow, for example. Exporter device 220 may sample a packet and may determine whether an entry for the flow associated with the packet exists in the flow table (e.g., based on matching a tuple in the packet header with an entry in the flow table). If exporter device 220 determines that an entry for the flow associated with the packet does not exist in the flow table, then exporter device 220 may create a new entry for the flow in the flow table (and may create a flow identifier for the flow, as described below). If exporter device 220 determines that an entry for the flow associated with the packet does exist in the flow table, then exporter device 220 may update the flow information (e.g., may update a byte count associated with the flow, a packet count associated with the flow, or the like).

In this way, exporter device 220 may store and/or update information associated with one or more flows and may export flow records to collector server 230, as described below. Collector server 230 may receive the flow records, and may provide information associated with the flow records to client device 250 for display to a network administrator, for example, for network planning, security monitoring, and/or the like.

As further shown in FIG. 4, process 400 may include assigning a flow identifier to the flow (block 420). For example, exporter device 220 may assign a flow identifier to the flow. In some implementations, exporter device 220 may assign a unique flow identifier to each flow in the flow table. For example, for each entry associated with a flow in the flow table, exporter device 220 may store a unique flow identifier. A flow identifier may include, for example, a value (e.g., a sequence of one or more digits, symbols, characters, letters, numbers, etc.) that identifies a particular flow. In some implementations, exporter device 220 may assign a flow identifier to the flow when creating an entry for the flow in the flow table (e.g., simultaneously with creating the flow entry). Additionally, or alternatively, exporter device 220 may assign a flow identifier to a flow having a flow entry in the flow table.

In some implementations, exporter device 220 may generate a flow identifier using a value that lies within a particular range. For example, exporter device 220 may receive information (e.g., may receive the information from another device, may be pre-configured with the information, or the like) that indicates a particular range of flow identifier values that exporter device 220 may assign to a flow. For example, multiple exporter devices 220 may receive information that indicates particular ranges of flow identifier values that each particular exporter device 220 may assign to flows. In some implementations, exporter device 220 may generate a flow identifier by hashing a tuple, by hashing a tuple along with an identifier of exporter device 220 (e.g., an observation domain identifier, a network address, a device identifier, or the like), or the like. In this way, collector server 230 may receive, from multiple exporter devices 220, flow records including flow identifiers that are unique across exporter devices 220.

Additionally, or alternatively, collector server 230 may associate a flow identifier with an identifier associated with a particular exporter device 220. For example, collector server 230 may associate the flow identifier with an identifier of exporter device 220, such as an observation domain identifier, a network address, a device identifier, or the like. In this way, collector server 230 may receive flow records from multiple exporter devices 220 and may attribute the flow records to the correct flow(s).

In this way, exporter device 220 may assign a flow identifier to the flow that may assist collector server 230 in attributing one or more flow records to the correct flow(s). Collector server 230 may store information associated with the flow, and may update the information as collector server 230 receives additional flow records that include the flow identifier, as described in more detail elsewhere herein.

As further shown in FIG. 4, process 400 may include determining whether a flow record associated with the flow has been exported (block 430). For example, exporter device 220 may determine whether a flow record, associated with the flow, has been exported to collector server 230. A flow record may include information associated with one or more fields stored in the flow table. Exporter device 220 may transmit an export packet, including one or more flow records, to collector server 230. Collector server 230 may receive the export packet and may process the flow records, as described below.

In some implementations, exporter device 220 may export a flow record when a flow inactively times out. For example, if exporter device 220 does not receive a packet associated with the flow in a threshold amount of time after last receiving a packet associated with the flow, then exporter device 220 may export a flow record associated with the flow. In some implementations, if a flow is inactively timed out, then exporter device 220 may remove the entry associated with the flow from the flow table.

Additionally, or alternatively, exporter device 220 may export a flow record when a flow actively times out. For example, exporter device 220 may export a flow record based on an active timeout (e.g., based on the flow being active for a threshold amount of time). In some implementations, exporter device 220 may export flow records at particular intervals (e.g., every one minute, two minutes, etc.) measured from a time of flow creation (e.g., a time at which exporter device 220 created an entry for the flow in the flow table) and/or measured from a time of a previous export (e.g., a time at which exporter device 220 last exported a flow record).

Exporter device 220 may export a flow record based on an active timeout, and exporter device 220 may retain the entry associated with the flow in the flow table, in some implementations. For example, exporter device 220 may reset one or more fields in the flow table (e.g., a packet count field, a byte count field, or the like) based on exporting a flow record, and may retain the flow entry in the flow table. Additionally, or alternatively, exporter device 220 may not reset one or more fields in the flow table based on exporting a flow record, and may retain the flow entry in the flow table. In some implementations, exporter device 220 may store information (e.g., in the flow table) indicating a quantity of flow records, associated with the flow and/or flow identifier, that exporter device 220 has exported to collector server 230. For example, exporter device 220 may update a counter in the flow table based on exporting one or more flow records. In this way, exporter device 220 may export multiple flow records, associated with the same flow, based on the flow being active for a particular duration.

In some implementations, exporter device 220 may determine whether a flow record associated with the flow has been exported to collector server 230. For example, exporter device 220 may determine whether a flow record associated with the flow has been exported based on a counter in the flow table (e.g., indicating a quantity of exports associated with the flow). Based on determining whether a flow record associated with the flow has been previously exported, exporter device 220 may generate a flow record according to either a first template or a second template, as described below.

As further shown in FIG. 4, if a flow record associated with the flow has not been exported (block 430—NO), then process 400 may include generating a flow record according to a first template (block 440). For example, exporter device 220 may generate a flow record according to a first template based on determining that a flow record associated with the flow has not been exported to collector server 230. A template may include information specifying a format for a flow record. For example, a template may include information specifying particular fields to be included in a flow record and may include information regarding each field (e.g., information identifying the field, information identifying a quantity of bytes associated with the field, and/or the like). Exporter device 220 may generate flow records based on one or more templates and may provide the one or more templates to collector server 230. In some implementations, client device 250 may provide exporter device 220 and/or collector server 230 with one or more templates (e.g., the first template, the second template, and/or another template). In this way, collector server 230 may use a particular template while decoding flow records that were generated based on the particular template.

In some implementations, the first template may include a first template identifier. A template identifier may include a value (e.g., a sequence of one or more digits, symbols, characters, letters, numbers, etc.) that identifies a template. For example, flow records that were generated based on a particular template may include a template identifier associated with the particular template. In this way, collector server 230 may identify and use a corresponding template when decoding a flow record (e.g., a flow record including the template identifier).

In some implementations, the first template may specify particular fields to be included in a flow record. The first template may specify that a flow record include fields corresponding to, for example, a flow identifier associated with the flow (e.g., in a flow identifier field, such as a UniqueFlowID field), a quantity of bytes associated with the flow, a quantity of packets associated with the flow, a type of service, a protocol, a quantity of Transmission Control Protocol (TCP) flags, a source port, a destination port, a source address, a destination address, a next hop address, a source autonomous system number, a destination autonomous system number, or the like.

In some implementations, exporter device 220 may receive information identifying the first template (e.g., may be pre-configured with the first template and/or may receive the first template from another device, such as client device 250). Additionally, or alternatively, exporter device 220 may generate the first template. Exporter device 220 may provide the first template to collector server 230, in some implementations. For example, exporter device 220 may provide the first template to collector server 230 based on an interval (e.g., every minute, two minutes, etc.) and/or based on transmitting a threshold quantity of export packets (e.g., every tenth export packet, or the like).

In some implementations, exporter device 220 may generate a flow record according to the first template (e.g., based on a first active timeout). For example, the flow record may include information from the flow table at the time of the active timeout (e.g., a packet count, a byte count, etc.). The first template may specify particular fields that are to be included in a flow record. Exporter device 220 may identify information (e.g., values from the flow table, values derived from values from the flow table, etc.) corresponding to the particular fields, and may generate the flow record according to the first template. Additionally, exporter device 220 may include the flow identifier in the flow record. In this way, collector server 230 may receive the flow record from exporter device 220, and may store information associated with the flow (e.g., in collector memory 240), as described below.

As further shown in FIG. 4, process 400 may include exporting the flow record that was generated according to the first template (block 450). For example, exporter device 220 may export, to collector server 230, the flow record that was generated according to the first template. Exporter device 220 may transmit an export packet, including the flow record, to collector server 230 (e.g., based on an active timeout of the flow). In some implementations, exporter device 220 may use a User Datagram Protocol (UDP) when exporting flow records to collector server 230. Additionally, or alternatively, exporter device 220 may use a different protocol (e.g., TCP) when exporting flow records to collector server 230. In some implementations, exporter device 220 may update a counter in the flow table based on exporting the flow record that was generated according to the first template.

Collector server 230 may receive the export packet and may decode the flow record using the first template. In some implementations, collector server 230 may store, in a data structure, the decoded information associated with the flow. For example, collector server 230 may store the information included in the flow record in collector memory 240. Additionally, collector server 230 may store the flow identifier in the data structure. In this way, collector server 230 may receive additional flow records and may aggregate the flow records based on the flow identifier (e.g., may update the information in the data structure), as described in more detail below.

As further shown in FIG. 4, if a flow record associated with the flow has been exported (block 430—YES), then process 400 may include generating a flow record according to a second template (block 460). For example, exporter device 220 may generate a flow record according to a second template based on determining that a flow record associated with the flow has been exported to collector server 230. For example, exporter device 220 may determine that one or more flow records associated with the flow have been exported to collector server 230 (e.g., based on a counter in the flow table), and may generate a flow record according to the second template.

In some implementations, the second template may include a second template identifier. For example, the second template may include a second template identifier that is different from the first template identifier (e.g., a different sequence of one or more digits, symbols, characters, letters, numbers, etc.). In this way, collector server 230, when decoding flow records including the second template identifier, may identify and use the second template.

In some implementations, the second template may specify particular fields to be included in a flow record. For example, the second template may specify a field corresponding to a flow identifier (e.g., a flow identifier field, such as a UniqueFlowID field). In some implementations, the second template may specify fields associated with values that may change between exports (e.g., between a first export and a second export, between a third export and a fourth export, etc.). Additionally, or alternatively, the second template may include fields associated with values that may change based on receiving additional packets associated with the flow. For example, the second template may include a field including a packet count associated with the flow, a field including a byte count associated with the flow, or the like. Additionally, or alternatively, the second template may include fields associated with values that may remain the same between exports and/or based on receiving additional packets associated with the flow.

In some implementations, the second template may specify a quantity of fields that is less than a quantity of fields included in the first template. For example, the first template may include a first quantity of fields to be included in a flow record, and the second template may include a second quantity of fields to be included in a flow record. The second quantity of fields is less than the first quantity of fields, in some implementations.

In some implementations, the first template may include fields associated with values that may remain the same between exports. Further, the first template may include fields associated with values that may remain the same based on receiving additional packets associated with the flow. For example, the first template may include fields indicating, a source port, a destination port, a source address, a destination address, a next hop address, or the like. In some implementations, the second template may not include one or more fields that were included in the first template (e.g., fields associated with values that may remain the same between exports and/or may remain the same based on receiving additional packets). In this way, a flow record that is generated based on the second template may include fewer bytes than a flow record that is generated based on the first template.

In some implementations, exporter device 220 may receive information identifying the second template (e.g., may be pre-configured with the second template and/or may receive the second template from another device, such as client device 250). In some implementations, client device 250 may provide exporter device 220 and/or collector server 230 with the second template. For example, a network administrator may provide input, via client device 250, to identify the second template and/or the fields to be included in the second template (e.g., fields associated with values that may remain the same between exports and/or may remain the same based on receiving additional packets). Additionally, or alternatively, exporter device 220 may generate the second template. For example, exporter device 220 may generate the second template based on identifying one or more fields associated with values that may change between exports.

In some implementations, exporter device 220 may identify one or more fields associated with values that may change between exports based on comparing one or more packets associated with the flow. For example, exporter device 220 may compare values associated with one or more packets associated with the flow, and may determine values that may remain the same with successive packets (e.g., a destination address, a source address, a destination port, a source port, a protocol, or the like). Additionally, or alternatively, exporter device 220 may determine values that may change with successive packets (e.g., a maximum time to live value, a minimum time to live value, a byte count, a packet count, or the like).

In some implementations, exporter device 220 may identify one or more fields that may change between exports based on comparing values included in the flow table. For example, exporter device 220 may determine one or more fields associated with values that may change in the flow table (e.g., a field indicating a packet count associated with the flow, a field indicating a byte count associated with the flow, or the like). In some implementations, exporter device 220 may generate the second template based on including one or more fields associated with values that may change between exports.

In some implementations, exporter device 220 may provide the second template to collector server 230. For example, exporter device 220 may provide the second template to collector server 230 based on an interval (e.g., every minute, every two minutes, etc.) and/or based on exporting a threshold quantity of export packets (e.g., every tenth export packet, every fiftieth export packet, or the like). In some implementations, exporter device 220 may provide the second template to collector server 230 based on generating the second template. In this way, collector server 230 may identify and use the second template when decoding flow records that were generated based on the second template.

In some implementations, exporter device 220 may generate a flow record based on the second template (e.g., based on an active timeout). For example, the flow record may include information from the flow table at the time of the active timeout (e.g., a packet count, a byte count, etc.). The second template may specify particular fields that are to be included in a flow record. Exporter device 220 may identify information (e.g., values from the flow table, values derived from values from the flow table, etc.) corresponding to the particular fields, and may generate the flow record according to the second template. In this way, collector server 230 may receive the flow record from exporter device 220, and may store information associated with the flow, as described below.

As further shown in FIG. 4, process 400 may include exporting the flow record that was generated according to the second template (block 470). For example, exporter device 220 may export, to collector server 230, the flow record that was generated according to the second template. Exporter device 220 may transmit an export packet, including the flow record, to collector server 230.

Collector server 230 may receive the export packet and may decode the flow record using the second template (e.g., based on the flow record including the second template identifier). In some implementations, collector server 230 may identify the flow identifier in the flow record, and may associate the information included in the flow record that was generated according to the second template with information stored in the data structure (e.g., information associated with the flow record that was generated according to the first template). In this way, collector server 230 may aggregate information corresponding to a flow (e.g., information received in multiple flow records) based on the flow identifier.

In this way, exporter device 220 may export a first flow record including one or more fields associated with values that may remain the same between exports (e.g., a flow record generated according to the first template). Collector server 230 may receive the flow record that was generated according to the first template, and may store the information associated with the flow (e.g., the values that may remain the same between exports). Additionally, in subsequent exports associated with the flow, exporter device 220 may export flow records that do not include the one or more fields associated with values that may remain the same between exports (e.g., flow records generated according to the second template). Collector server 230 may identify the flow identifier in the subsequent flow records, and may associate the information included in the subsequent flow records with the information included in the first flow record.

In this way, exporter device 220 may reduce the size of flow records by including a subset of the flow information (e.g., fewer fields than a quantity of fields in the first flow record) in subsequent flow records. Implementations herein may assist exporter device 220 in conserving processor and memory resources while updating flow information and exporting flow records. Additionally, implementations described herein may assist collector server 230 in conserving processor and memory resources while processing flow records. Further, network resources may be conserved based on the reduced size of export flow records and/or packets. Implementations described herein may reduce the quantity of export packets that are dropped by collector server 230 and/or not received by collector server 230.

In some implementations, exporter device 220 may generate a flow record according to the first template despite the flow already having been exported. For example, exporter device 220 may generate a flow record according to the first template based on exporting a threshold quantity of export packets associated with the flow (e.g., every fifth export packet, every tenth export packet, or the like). For example, if exporter device 220 uses a UDP protocol for export packets, then delivery of the export packet may not be guaranteed. In this way, if the first export packet (e.g., the packet including the flow record generated according to the first template) is dropped and/or not received by collector server 230, then exporter device 220 may export another export packet including a flow record that was generated according to the first template.

Additionally, or alternatively, exporter device 220 may generate a flow record according to the first template based on receiving a request from collector server 230. For example, if collector server 230 receives a flow record that was generated according to the second template, and did not receive a flow record that was generated according to the first template, then collector server 230 may request that exporter device 220 provide a flow record that was generated based on the first template. For example, collector server 230 may determine that information (e.g., information associated with the fields that remain the same between exports) is not stored, and may request exporter device 220 to provide the information.

Implementations described herein may allow an exporter device 220 to reduce the size of flow records by not including, in subsequent flow records, one or more fields that are associated with values that may remain the same between exports. In this way, fields that are associated with values that may be repetitive between exports may be removed from subsequent flow records, thereby resulting in a reduction in the quantity of bytes associated with flow records. Implementations described herein may conserve memory, processor, and/or network resources by reducing the size of flow records and/or export packets.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may assist an exporter device in reducing the size of flow records. For example, the exporter device may include a first quantity of fields in a first export packet, and may include a second quantity of fields in subsequent export packets. The second quantity of fields includes fewer fields than the first quantity of fields. In this way, the exporter device may conserve processor and memory resources while exporting flow records. Further, the quantity of flow records included in an export packet may be increased based on the reduced size of the flow records. In this way, network resources may be conserved based on the reduced size of the flow records and/or based on the reduced quantity of export packets needed to export a quantity of flow records. Implementations described herein may also conserve processor and memory resources of the collector server based on the reduced size of the flow records and/or based on the reduced quantity of export packets needed to export the flow records.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive a packet associated with a flow;
assign a flow identifier to the flow;
generate a first flow record based on a first template,
the first flow record including the flow identifier and a first quantity of fields determined based on the first template,
the first quantity of fields including fields having values that change between exports and fields having values that remain the same between exports;
export the first flow record;
generate a second flow record, including the flow identifier, based on a second template and based on determining that the first flow record has been exported,
the second flow record including a second quantity of fields, determined based on the second template, that is less than the first quantity of fields,
the second quantity of fields relating to the fields of the first quantity of fields that may change between exports,
the second flow record being reduced in size from the first flow record; and
export the second flow record.

2. The device of claim 1, where the one or more processors, when generating the second flow record, are to:

determine that a threshold quantity of flow records, associated with the flow, have been exported; and
generate the second flow record based on determining that the threshold quantity of flow records associated with the flow have been exported.

3. The device of claim 1, where the one or more processors are further to:
generate a third flow record, including the flow identifier, based on the first template after exporting the second flow record; and export the third flow record.

4. The device of claim 1, where the one or more processors are further to:
receive information that identifies a range of flow identifier values that may be assigned by the device;
generate the flow identifier based on the range of flow identifier values; and
where the one or more processors, when assigning the flow identifier to the flow, are to:
assign the flow identifier to the flow based on generating the flow identifier.

5. The device of claim 1, where the one or more processors, when generating the first flow record based on the first template, are to:
include a first template identifier, that identifies the first template, in the first flow record; and
where the one or more processors, when generating the second flow record based on the second template, are to:
include a second template identifier, that identifies the second template, in the second flow record,
the second template identifier being different from the first template identifier.

6. The device of claim 1, where the packet is a first packet; where the one or more processors are further to:
receive a second packet associated with the flow;
determine one or more fields that are associated with values that are common in the first packet and the second packet; and
where the one or more processors, when generating the second flow record, are to:
generate the second flow record based on determining the one or more fields that are associated with values that are common in the first packet and the second packet,
the second flow record not including the one or more fields that are associated with values that are common in the first packet and the second packet.

7. The device of claim 1, where the one or more processors, when exporting the first flow record, are to:
export the first flow record based on a first timeout associated with the flow.

8. A non-transitory computer-readable medium storing instructions, the instructions comprising:
one or more instructions that, when executed by one or more processors of a device, cause the one or more processors to:
receive network traffic associated with a flow;
assign a flow identifier to the flow;
generate a first flow record based on a first template, the first flow record including the flow identifier and a first quantity of fields determined based on the first template,
the first quantity of fields including fields having values that change between exports and fields having values that remain the same between exports;
export the first flow record;
generate a second flow record, including the flow identifier, based on a second template and based on determining that the first flow record has been exported,
the second flow record including a second quantity of fields, determined based on the second template, that is less than the first quantity of fields,
the second quantity of fields relating to the fields of the first quantity of fields that may change between exports,
the second flow record being reduced in size from the first flow record; and
export the second flow record.

9. The non-transitory computer-readable medium of claim 8, where the one or more instructions, when executed by the one or more processors, further cause the one or more processors to:
store, in a flow table, values associated with the flow based on receiving the network traffic;
identify values in the flow table that change based on receiving the network traffic; and
where the one or more instructions, that cause the one or more processors to generate the second flow record, cause the one or more processors to:
generate the second flow record based on identifying the values in the flow table that change,
the second flow record including the values in the flow table that change.

10. The non-transitory computer-readable medium of claim 8, where the first flow record includes a field corresponding to a source address, a source port, a destination address, a destination port, or a protocol associated with the flow, and
where the second flow record does not include the field.

11. The non-transitory computer-readable medium of claim 8, where the one or more instructions, when executed by the one or more processors, further cause the one or more processors to:
determine that a threshold quantity of flow records, associated with the flow, have been exported;
generate a third flow record, associated with the flow, according to the first template based on determining that the threshold quantity of flow records have been exported; and
export the third flow record.

12. The non-transitory computer-readable medium of claim 8, where the one or more instructions, when executed by the one or more processors, further cause the one or more processors to:
receive the first template including a first template identifier;
receive the second template including a second template identifier,
the second template identifier being different than the first template identifier;
where the one or more instructions, that cause the one or more processors to generate the first flow record, cause the one or more processors to:
generate the first flow record including the first template identifier; and
where the one or more instructions, that cause the one or more processors to generate the second flow record, cause the one or more processors to:
generate the second flow record including the second template identifier.

13. The non-transitory computer-readable medium of claim 8, where the one or more instructions, further cause the one or more processors to:
  determine that the first flow record has been exported; and
  where the one or more instructions, that cause the one or more processors to generate the second flow record, cause the one or more processors to:
    generate the second flow record based on determining that the first flow record has been exported.

14. The non-transitory computer-readable medium of claim 8, where the one or more instructions, that cause the one or more processors to generate the first flow record, cause the one or more processors to:
  generate the first flow record based on a first timeout; and
  where the one or more instructions, that cause the one or more processors to generate the second flow record, cause the one or more processors to:
    generate the second flow record based on a second timeout.

15. A method, comprising:
  receiving, by a device, network traffic associated with a flow;
  assigning, by the device, a flow identifier to the flow;
  generating, by the device, a first flow record based on a first template,
    the first flow record including the flow identifier and a first quantity of fields determined based on the first template,
      the first quantity of fields including fields having values that change between exports and fields having values that remain the same between exports;
  exporting, by the device, the first flow record;
  determining, by the device, that the first flow record has been exported;
  generating, by the device, a second flow record, including the flow identifier, based on a second template and based on determining that the first flow record has been exported,
    the second template being different from the first template,
    the second flow record including a second quantity of fields, determined based on the second template, that is less than the first quantity of fields,
      the second quantity of fields relating to the fields of the first quantity of fields that may change between exports,
    the second flow record being reduced in size from the first flow record; and
  exporting, by the device, the second flow record.

16. The method of claim 15, further comprising:
  determining that the second flow record has been exported; and
  generating a third flow record, including the flow identifier, based on the second template, based on determining that the second flow record has been exported.

17. The method of claim 15, further comprising:
  storing, in a flow table, values associated with the flow based on receiving the network traffic;
  determining one or more values in the flow table that change based on receiving the network traffic; and
  where generating the second flow record further comprises:
    generating the second flow record based on determining the one or more values that change,
      the second flow record including the one or more values that change.

18. The method of claim 15, where the first flow record includes a first template identifier that identifies the first template,
  where the second flow record includes a second template identifier that identifies the second template;
  where generating the first flow record further comprises:
    generating the first flow record including the first template identifier; and
  where generating the second flow record further comprises:
    generating the second flow record including the second template identifier.

19. The method of claim 15, further comprising:
  determining that a threshold quantity of flow records associated with the flow have been exported; and
  generating a third flow record, including the flow identifier, based on the first template, based on determining that the threshold quantity of flow records associated with the flow have been exported.

20. The method of claim 15, further comprising:
  determining that the flow has been active for a threshold quantity of time based on receiving the network traffic; and
  where generating the first flow record comprises:
    generating the first flow record based on determining that the flow has been active for the threshold quantity of time.

* * * * *